(12) United States Patent
Kerr (10) Patent No.: US 12,536,559 B2
(45) Date of Patent: Jan. 27, 2026

(54) PLAYER TRACKING USING A WIRELESS DEVICE FOR A CASINO PROPERTY

(71) Applicant: NEXRF CORP., Reno, NV (US)

(72) Inventor: Michael A. Kerr, Reno, NV (US)

(73) Assignee: NEXRF CORP, Reno, NV (US)

( * ) Notice: Subject to any disclaimer, the term of this patent is extended or adjusted under 35 U.S.C. 154(b) by 203 days.

(21) Appl. No.: 17/516,528

(22) Filed: Nov. 1, 2021

(65) Prior Publication Data

US 2022/0164820 A1 May 26, 2022

Related U.S. Application Data

(63) Continuation of application No. 15/159,062, filed on May 19, 2016, now abandoned, which is a
(Continued)

(51) Int. Cl.
*G06Q 30/0226* (2023.01)
*G06Q 50/34* (2012.01)
(Continued)

(52) U.S. Cl.
CPC ......... *G06Q 30/0231* (2013.01); *G06Q 50/34* (2013.01); *G07F 17/3239* (2013.01);
(Continued)

(58) Field of Classification Search
None
See application file for complete search history.

(56) References Cited

U.S. PATENT DOCUMENTS 3,739,329 A * 6/1973 Lester ................. G08B 3/1083
367/6
5,738,583 A * 4/1998 Comas ................. A63F 13/12
463/40
(Continued)

FOREIGN PATENT DOCUMENTS

| JP | 2004105321 A | * | 4/2004 | ............... A63F 5/00 |
| WO | WO-03015299 A1 | * | 2/2003 | ........... G07F 7/0866 |
| WO | WO-2016049593 A1 | * | 3/2016 | ............ H04W 4/023 |

OTHER PUBLICATIONS

Sally M. Gainsbury et al. A taxonomy of gambling and casino games via social media and online technologies. (Feb. 24, 2014). Retrieved online Mar. 2, 2021 https://www.tandfonline.com/doi/full/10.1080/14459795.2014.890634 (Year: 2014).*
(Continued)

*Primary Examiner* — James A Reagan
(74) *Attorney, Agent, or Firm* — Michael A. Kerr; Kerr IP Group, LLC (57) ABSTRACT

A method for tracking patronage of a customer in at least one casino property is described. The method comprises monitoring a wireless handset location that is associated with the customer using a server. The server then proceeds to authenticate the wireless handset and the wireless handset communicates location information to server using at least one wireless networking protocol. The server generates a user profile associated with the customer that comprises at least one attribute. Complimentary prizes are determined by the server based on at least one attribute of the user profile. And the server sends a message to the wireless handset that is associated with the complimentary prize.

20 Claims, 2 Drawing Sheets

Related U.S. Application Data continuation of application No. 11/948,007, filed on Nov. 30, 2007, now Pat. No. 9,373,116.

(60) Provisional application No. 60/872,351, filed on Nov. 30, 2006.

(51) Int. Cl.

| | |
|---|---|
| *G07F 17/32* | (2006.01) |
| *H04M 1/7243* | (2021.01) |
| *H04M 1/72457* | (2021.01) |
| *H04W 4/02* | (2018.01) |
| *H04W 4/029* | (2018.01) |
| *H04W 4/12* | (2009.01) |
| *H04W 8/18* | (2009.01) |

(52) U.S. Cl.
CPC .... *G07F 17/3288* (2013.01); *H04M 1/72457* (2021.01); *H04W 4/02* (2013.01); *H04W 4/029* (2018.02); *H04W 4/12* (2013.01); *H04W 8/18* (2013.01); *H04M 1/7243* (2021.01)

(56) References Cited

U.S. PATENT DOCUMENTS

| | | | |
|---|---|---|---|
| 5,761,647 A * | 6/1998 | Boushy | G06Q 10/06375 705/7.29 |
| 5,768,382 A | 6/1998 | Schneier et al. | |
| 5,779,545 A * | 7/1998 | Berg | G07F 17/3223 463/22 |
| 5,851,149 A | 12/1998 | Xidos et al. | |
| 6,001,016 A | 12/1999 | Walker et al. | |
| 6,508,709 B1 | 1/2003 | Karmarkar | |
| 6,612,928 B1 * | 9/2003 | Bradford | G06F 21/31 463/29 |
| 6,640,218 B1 | 10/2003 | Golding et al. | |
| 6,709,333 B1 | 3/2004 | Bradford et al. | |
| 6,719,631 B1 | 4/2004 | Tulley et al. | |
| 6,875,110 B1 | 4/2005 | Crumby | |
| 7,066,815 B2 * | 6/2006 | Walker | G07F 17/32 463/43 |
| 7,123,149 B2 | 10/2006 | Nowak | G06K 17/0022 340/572.1 |
| 7,319,395 B2 * | 1/2008 | Puzio | G08B 21/0225 340/572.1 |
| 7,329,185 B2 * | 2/2008 | Conover | G06Q 30/0226 463/25 |
| 7,470,196 B1 * | 12/2008 | Joshi | G07F 17/32 463/16 |
| 7,830,250 B2 | 11/2010 | Huseth et al. | |
| 8,506,406 B2 * | 8/2013 | Kerr | G07F 17/32 463/42 |
| 8,719,086 B1 * | 5/2014 | Gala | G06Q 30/0222 463/17 |
| 8,727,892 B1 * | 5/2014 | Chun | G07F 17/3225 463/40 |
| 8,738,024 B1 | 5/2014 | Kerr et al. | |
| 8,758,111 B2 * | 6/2014 | Lutnick | G07F 17/34 463/16 |
| 8,935,279 B2 * | 1/2015 | Skeen | G06F 16/639 707/754 |
| 9,373,116 B1 * | 6/2016 | Kerr | G06Q 50/34 |
| 9,646,454 B1 * | 5/2017 | Kerr | G06Q 30/0224 |
| 10,255,763 B2 * | 4/2019 | Washington | A63F 13/352 |
| 11,386,747 B2 * | 7/2022 | Nguyen | G07F 17/3239 |
| 2001/0044337 A1 * | 11/2001 | Rowe | A63F 13/12 463/29 |
| 2002/0103027 A1 * | 8/2002 | Rowe | G07F 17/3239 463/39 |
| 2002/0142844 A1 | 10/2002 | Kerr | |
| 2002/0142846 A1 * | 10/2002 | Paulsen | G06Q 30/0209 463/43 |
| 2002/0198775 A1 | 12/2002 | Ryan | |
| 2003/0182191 A1 * | 9/2003 | Oliver | G06Q 30/02 705/14.27 |
| 2003/0187736 A1 * | 10/2003 | Teague | G06Q 10/10 705/14.31 |
| 2003/0200140 A1 * | 10/2003 | Hars | G06Q 30/02 705/14.31 |
| 2003/0212597 A1 * | 11/2003 | Ollins | G07F 17/3255 705/14.31 |
| 2004/0023721 A1 | 2/2004 | Giobbi | |
| 2004/0203854 A1 * | 10/2004 | Nowak | H04W 4/02 455/414.1 |
| 2005/0076210 A1 | 4/2005 | Thomas et al. | |
| 2005/0085257 A1 | 4/2005 | Laird et al. | |
| 2005/0215233 A1 | 9/2005 | Perera et al. | |
| 2005/0261063 A1 | 11/2005 | Boyd et al. | |
| 2006/0125693 A1 | 6/2006 | Recker | |
| 2006/0136742 A1 * | 6/2006 | Giobbi | G06Q 20/346 713/185 |
| 2006/0143441 A1 * | 6/2006 | Giobbi | G06F 21/35 713/155 |
| 2006/0148551 A1 * | 7/2006 | Walker | G07F 17/323 463/16 |
| 2006/0189382 A1 * | 8/2006 | Muir | G07F 17/32 463/29 |
| 2006/0194633 A1 | 8/2006 | Paulsen | |
| 2006/0252530 A1 * | 11/2006 | Oberberger | G07F 17/3239 463/29 |
| 2006/0287810 A1 | 12/2006 | Sadri et al. | |
| 2006/0287813 A1 | 12/2006 | Quigley | |
| 2007/0060306 A1 | 3/2007 | Amaitis et al. | |
| 2007/0077981 A1 * | 4/2007 | Hungate | G07F 17/3267 463/16 |
| 2007/0100963 A1 | 5/2007 | Ban et al. | |
| 2007/0136132 A1 | 6/2007 | Weiser et al. | |
| 2007/0167210 A1 | 7/2007 | Kelly et al. | |
| 2007/0281692 A1 | 12/2007 | Bucher et al. | |
| 2007/0286369 A1 | 12/2007 | Gutt et al. | |
| 2008/0057894 A1 | 3/2008 | Aleksic et al. | |
| 2008/0064492 A1 | 3/2008 | Oosthoek | |
| 2008/0113785 A1 | 5/2008 | Alderucci et al. | |
| 2008/0149705 A1 * | 6/2008 | Giobbi | G06Q 30/0209 235/376 |
| 2008/0153515 A1 | 6/2008 | Mock et al. | |
| 2008/0207296 A1 | 8/2008 | Lutnick et al. | |
| 2008/0249833 A1 | 10/2008 | Ali et al. | |
| 2009/0170614 A1 * | 7/2009 | Herrmann | G06Q 30/02 463/43 |
| 2009/0197684 A1 | 8/2009 | Arezina et al. | |
| 2009/0254824 A1 | 10/2009 | Singh | |
| 2010/0022308 A1 | 1/2010 | Hartmann et al. | |
| 2010/0048242 A1 | 2/2010 | Rhoads et al. | |
| 2010/0211431 A1 | 8/2010 | Lutnick et al. | |
| 2010/0250939 A1 | 9/2010 | Adams et al. | |
| 2011/0078167 A1 | 3/2011 | Sundaresan et al. | |
| 2014/0295944 A1 | 10/2014 | Faircloth | |
| 2014/0310513 A1 | 10/2014 | Barney et al. | |
| 2015/0134949 A1 | 5/2015 | Baldwin | |
| 2016/0093154 A1 * | 3/2016 | Bytnar | G07F 17/3237 463/25 |
| 2016/0232750 A1 * | 8/2016 | Hardy | G07F 17/3239 |
| 2017/0178157 A1 | 6/2017 | Jayaram | |
| 2017/0186270 A1 * | 6/2017 | Acres | G07F 17/3272 |
| 2019/0026981 A1 * | 1/2019 | Petersen | G07F 17/3244 |
| 2019/0325701 A1 * | 10/2019 | Higgins | G06Q 20/363 |
| 2019/0340871 A1 * | 11/2019 | Miri | G07F 17/323 |
| 2020/0020196 A1 * | 1/2020 | Petersen | G07F 17/3218 |
| 2020/0234536 A1 * | 7/2020 | Azzam | G07F 17/3209 |
| 2021/0104122 A1 * | 4/2021 | Shepherd | G06Q 20/0655 |
| 2022/0309861 A1 * | 9/2022 | Wenzl | G07F 17/323 |

OTHER PUBLICATIONS

United States Senate. Protecting Mobile Privacy: Your Smartphones, Tablets, Cell Phones and Your Privacy. (May 10, 2011). Retrieved online Mar. 2, 2021. https://www.judiciary.senate.gov/imo/media/doc/CHRG-112shrg86775.pdf (Year: 2011).*

(56) References Cited

OTHER PUBLICATIONS

Proxsense, Specification (U.S. Appl. No. 60/865,596). Retrieved from PE2E Nov. 15, 2021. Incorporated by reference in US 2006/0136742 A1 to Giobbi. (Year: 2006).*
0034-IPR2021-00952_May 26, 2021_Paper 02_Playtika Power of Attorney.
0034-IPR2021-00953_May 26, 2021_Paper 01_Playtika Petition for IPR of U.S. Pat. No. 9,646,454.
0035-IPR2021-00951_Ex-1002—U.S. Appl. No. 12/981,403 (U.S. Pat. No. 8,747,229).
0035-IPR2021-00952_Ex-1005—U.S. Pat. No. 7,470,196 (Joshi).
0035-IPR2021-00953_Ex-1007—U.S. Pat. No. 5,586,937 (Menashe).
0036-IPR2021-00951_Ex-1011—Access Systems PTY.
0036-IPR2021-00952_Ex-1004—Friedman CV.
0036-IPR2021-00953_Ex-1011—Ohlson, Submission of Lasseters Online to AIC.
0037-IPR2021-00951_May 26, 2021_Paper 01_Playtika Petition for IPR of U.S. Pat. No. 8,747,229.
0037-IPR2021-00953_Ex-1005—U.S. Pat. No. 7,470,196 (Joshi).
0038-IPR2021-00951_Ex-1005—U.S. Pat. No. 7,470,196 (Joshi).
0038-IPR2021-00953_Ex-1008—U.S. Pat. No. 6,234,896 (Walker 896).
0039-IPR2021-00951_Ex-1013—Smith, Content-Based Transcoding of Images in the Internet.
0040-IPR2021-00951, Petitioner's Ex-1017—U.S. Pat. No. 6,409,602 (Wiltshire).
CAFC_Plaintiff-Appellant Reply Brief_2.3.22.
DNev Caesars Motion to Dismiss.
DNev Caesars MTD Reply.
DNev Defendants' Stay Reply.
DNev MTD Judgement.
DNev MTD Order.
DNev NEXRF Opposition to MTDs.
DNev NEXRF Opposition to Stay.
DNev Playtika Motion to Dismiss.
DNev Playtika Motion to Stay pending MTD ruling.
DNev Playtika MTD Reply.
DNev Playtika-Caesars Complaint.
DNev Stay Order.
IPR2021-951_ Exhibit 2008.
IPR2021-951_ Exhibit 2010_Excerpted.
IPR2021-951_ Exhibit 2011_Excerpted.
IPR2021-951_ Exhibit 2012.
IPR2021-951_Exhibit 2009.
IPR2021-951_Patent Owner Response.
IPR2021-953, Exhibit 2009.
IPR2021-953_ Exhibit 2008.
IPR2021-953_ Exhibit 2010_Excerpted.
IPR2021-953_ Exhibit 2011_Excerpted.
IPR2021-953_ Exhibit 2012.
IPR2021-953_Patent Owner Response.
WWash Aristocrat Complaint.
WWash Defendants' Motion to Dismiss.
WWash Defendants' Motion to Stay.
WWash Defendants' MTD Reply.
WWash Defendants' Stay Reply.
WWash DoubleU-DoubleDown Complaint.
WWash NEXRF Opposition to MTD.
WWash NEXRF Opposition to Stay.
WWash Stay Order.
WWash Stipulated Order of Dismissal.
Giobbi/Proxsense, Co-pending U.S. Appl. No. 60/865,596, filed Nov. 13, 2006, p. 3.
0001-IPR2021-00951—Patent Owner's Sur Reply.
0001-Patent Owner's Sur Reply IPR2021-00952.
0001-Patent Owner's Sur Reply IPR2021-00953.
0002-IPR2021-00951_Ex-1022—DI 60 NEXRF Notice of Appeal.
0002-IPR2021-00952_Ex-1022—DI 60 NEXRF Notice of Appeal.
0002-IPR2021-00953_Ex-1022—DI 60 NEXRF Notice of Appeal.
0003-IPR2021-00951_Ex-1020—DI 28 Playtica Motion to Dismiss.
0003-IPR2021-00952_Ex-1020—DI 28 Playtica Motion to Dismiss.
0003-IPR2021-00953_Ex-1020—DI 28 Playtica Motion to Dismiss.
0004-IPR2021-00951_Ex-1019—Board Email Authorizing Supplemental Briefing.
0004-IPR2021-00952_Ex-1019—Board Email Authorizing Supplemental Briefing.
0004-IPR2021-00953_Ex-1019—Board Email Authorizing Supplemental Briefing.
0005-IPR2021-00951_Sep. 27, 2021_Paper 12_Petitioners Supplemental Brief.
0005-IPR2021-00952_Sep. 27, 2021_Paper 12_Petitioners Supplemental Brief.
0005-IPR2021-00953_Sep. 27, 2021_Paper 14_Petitioners Supplemental Brief.
0006-IPR2020-00953 PHV Order Gosselin Circ.
0006-IPR2021-00951—PHV Order Gosselin Circ.
0006-IPR2021-00952—PHV Order Gosselin Circ.
0007-IPR2020_00952 PHV Order Gosselin.
0007-IPR2020-00951 PHV Order Gosselin Circ.
0007-IPR2021-00953 PHV Order Gosselin.
0008-IPR2021-00951 Ex 2007 Gosselin Declaration in Support of Patent Owner Motion for Pro Hac Vice.
0008-IPR2021-00952 Patent Owner Motion for Pro Hac Vice C. Gosselin.
0008-IPR2021-00953 Ex 2007 Gosselin Declaration in Support of Patent Owner Motion for Pro Hac Vice.
0009-Ex 2007 Gosselin Declaration in Support of Patent Owner Motion for Pro Hac Vice 00952.
0009-Patent Owner Motion for Pro Hac Vice C. Gosselin 00953.
0009-Patent Owner Motion for Pro Hac Vice Christopher Gosselin 00951.
0010-IPR2021-00951-2006_DI 58 Order—Defendant Caesars Interactive Entertainment's motion to dismiss (ECF No. 26) is granted.
0010-IPR2021-00952-2006_DI 58 Order—Defendant Caesars Interactive Entertainment's motion to dismiss (ECF No. 26) is granted.
0010-IPR2021-00953-2006_DI 58 Order—Defendant Caesars Interactive Entertainment's motion to dismiss (ECF No. 26) is granted.
0011-IPR2021-00951-2005_DI 59 Judgment in favor of Defendants'.
0011-IPR2021-00952-2005_DI 59 Judgment in favor of Defendants'.
0011-IPR2021-00953-2005_DI 59 Judgment in favor of Defendants'.
0012-IPR2021-00951-2004_U.S. Pat. No. 6,361,437B1 00951.
0012-IPR2021-00953-2004_U.S. Pat. No. 6,361,437B1.
0012-NEXRF POPR 952 IPR.
0013-IPR2021-00951-2003_Part2of 2_Joshi prosecution history 09688501.
0013-IPR2021-00953-2003_Part2of 2_Joshi prosecution history 09688501.
0013-NEXRF Patent Owner Mandatory Notices—IPR2021-00952_(2635949.1).
0014-IPR2021-00951-2003_Part1of 2_Joshi prosecution history 09688501.
0014-IPR2021-00953-2003_Part1of 2_Joshi prosecution history 09688501.
0014-Patent Owner Power of Attorney—IPR2021-00952(2635937.1).
0015-406 POA-00952.
0015-IPR2021-00951-2002_U.S. Pat. No. 8,747,229 File History.
0015-IPR2021-00952-2002_U.S. Pat. No. 8,747,229 File History.
0016-2001_U.S. Pat. No. 6,001,016.
0016-2001_U.S. Pat. No. 6,001,016 00953.
0016-406 Mandatory Notices-00952.
0017-IPR2021-00952 Notice of Filing Date Accorded to Petition (No errors) (IPR PGR and CBM Only).
0017-NEXRF POPR 951 IPR.
0017-NEXRF POPR 953 IPR.
0018-IPR2021-00952_Ex-1010—U.S. Pat. No. 5,746,656 (Bezick).

(56) References Cited

OTHER PUBLICATIONS

0018-Patent Owner Power of Attorney—IPR2021-00951 (2635936.1).
0018-Patent Owner Power of Attorney—IPR2021-00953 (2635958.1).
0019-IPR2021-00952_Ex-1006—EP 0934765 A1 (Agasse).
0019-NEXRF Patent Owner Mandatory Notices—IPR2021-00951_(2635955.1).
0019-Patent Owner Power of Attorney—IPR2021-00953(2635958.1).
0020-229 POA.
0020-IPR2021-00952_Ex-1012—Access Systems PTY.
0020-Patent Owner Power of Attorney—IPR2021-00953 (2635958.1).
0021-229 Mandatory Notices.
0021-IPR2021-00952_Ex-1002—U.S. Appl. No. 12/982,018 (U.S. Pat. No. 8,506,406).
0021-NEXRF Patent Owner Updated Mandatory Notices—IPR2021-00953_(2635953.1).
0022-454 POA-00953.
0022-IPR2021-00951 Notice of Filing Date Accorded to Petition (No errors) (IPR PGR and CBM Only).
0022-IPR2021-00952_Ex-1001—U.S. Pat. No. 8,506,406 (Kerr).
0023-454 Mandatory Notices-00953.
0023-IPR2021-00951_Ex-1006—EP 0934765 A1 (Agasse).
0023-IPR2021-00952_Ex-1008—U.S. Pat. No. 6,234,896 (Walker 896).
0024-IPR2021-00951_Ex-1018—U.S. Appl. No. 09/688,501 (Joshi application).
0024-IPR2021-00952_Ex-1007—WO 1998040140 A1 (Muir 140).
0024-IPR2021-00953 Notice of Filing Date Accorded to Petition (No errors) (IPR PGR and CBM Only).
0025-IPR2021-00951_Ex-1015—Complaint Against All Defendants.
0025-IPR2021-00952_Ex-1014—U.S. Pat. No. 6,874,084 (Dobner).
0025-IPR2021-00953_Ex-1002—U.S. Appl. No. 14/189,918 (U.S. Pat. No. 9,646,454).
0026-IPR2021-00951_Ex-1001—U.S. Pat. No. 8,747,229 (Kerr).
0026-IPR2021-00952_Ex-1003—Friedman Declaration.
0026-IPR2021-00953_Ex-1001—U.S. Pat. No. 9,646,454 (Kerr).
0027-IPR2021-00951_Ex-1007—U.S. Pat. No. 5,918,013 (Mighdoll).
0027-IPR2021-00952_Ex-1011—Ohlson, Submission of Lasseters Online to AIC.
0027-IPR2021-00953_Ex-1003—Friedman Declaration.
0028-IPR2021-00951_May 26, 2021_Paper 02_Playtika Power of Attorney.
0028-IPR2021-00952_Ex-1017—Complaint Against All Defendants.
0028-IPR2021-00953_Ex-1010—U.S. Pat. No. 6,985,934 (Armstrong).
0029-IPR2021-00951_Ex-1016—Network Performance Effects of HTTP (Nielsen).
0029-IPR2021-00952_Ex-1015—U.S. Pat. No. 5,918,013 (Mighdoll).
0029-IPR2021-00953_Ex-1012—Access Systems PTY.
0030-IPR2021-00951_Ex-1012—U.S. Pat. No. 6,874,084 (Dobner).
0030-IPR2021-00952_May 26, 2021_Paper 01_Playtika Petition for IPR of U.S. Pat. No. 8,506,406.
0030-IPR2021-00953_Ex-1004—Friedman CV.
0031-IPR2021-00951_Ex-1004—Friedman CV.
0031-IPR2021-00952_Ex-1009—U.S. Pat. No. 7,127,069 (Nguyen).
0031-IPR2021-00953_Ex-1015—WO 1998040140 A1 (Muir).
0032-IPR2021-00951_Ex-1009—AU 721645 B2 (Finlayson).
0032-IPR2021-00952_Ex-1016—U.S. Pat. No. 5,586,937 (Menashe).
0032-IPR2021-00953_Ex-1014—U.S. Pat. No. 6,874,084 (Dobner).
0033-IPR2021-00951_Ex-1010—Ohlson, Submission of Lasseters Online to AIC.
0033-IPR2021-00952_Ex-1018—U.S. Pat. No. 6,985,934 (Armstrong).
0033-IPR2021-00953_May 26, 2021_Paper 02_Playtika Power of Attorney.
0034-IPR2021-00951_Ex-1003—Friedman Declaration.

* cited by examiner

Figure 1

Figure 2 ing a wireless communication device for a casino property. More particularly, the invention relates to sending messages to wireless devices based on user preferences, location, and player tracking information.

PLAYER TRACKING USING A WIRELESS DEVICE FOR A CASINO PROPERTY

CROSS REFERENCE

This patent application is a Continuation of non-provisional patent application Ser. No. 15/159,062 filed on May 19, 2016 and entitled PLAYER TRACKING USING A WIRELESS DEVICE FOR A CASINO PROPERTY;
this patent application is a Continuation of non-provisional patent application Ser. No. 11/948,007 filed on Nov. 30, 2007 and entitled PLAYER TRACKING USING A WIRELESS DEVICE FOR A CASINO PROPERTY, which claims the benefit of priority from provisional patent application No. 60/872,351 filed on Nov. 30, 2006 and entitled PLAYER TRACKING USING A WIRELESS HANDSET FOR A CASINO PROPERTY; and
all of which are hereby incorporated by reference.

FIELD

This invention relates to player tracking using a wireless communication device for a casino property. More particularly, the invention relates to sending messages to wireless devices based on user preferences, location, and player tracking information.

BACKGROUND

Generally, present day player tracking systems rely on the use of mag stripe cards. Currently, wireless devices are being promoted that perform various player tracking functions. However, these wireless devices are generally limited to being used exclusively on the casino floor for wireless gaming. These wireless devices are not enabled to take advantage of the player's mobility in the casino megaplex or similar large entertainment property.

SUMMARY

A method for tracking patronage of a customer in at least one casino property is described. The method comprises monitoring a wireless handset location associated with the customer. Then the server authenticates the wireless handset and the wireless handset communicates location information to server using at least one wireless networking protocol. The server generates a user profile associated with the customer that comprises at least one attribute. Then the server determines a complimentary prize based on at least one attribute of the user profile. And the server sends a message to the wireless handset that is associated with the complimentary prize.

A system for tracking customer activity at a casino property is also described. The system comprises a wireless handset associated with the customer and that is configured to transmit location information to a server. The wireless handset is configured to communicate with the server over a network using at least one wireless networking protocol. The server is configured to authenticate the wireless handset and monitor the wireless handset's location. The server is also configured to generate a user profile associated with the customer that includes at least one attribute. The server is further configured to determine a complimentary prize based on at least one attribute of the user profile and send a message to the wireless handset that is associated with the complimentary prize.

A method for communicating a particular message to a wireless handset is also described. The method comprises communicatively coupling at least one computer system associated with a casino property to the wireless handset. The at least one computer system stores a plurality of messages each associated with a geographical area. The wireless handset then authenticates the at least one computer system associated with the casino property and the at least one computer system determines a location for the wireless handset. The computer system then generates a user profile associated with the wireless handset, and the user profile includes at least one attribute. The particular message is then transmitted from the at least one computer system to the wireless handset. The particular message is associated with the location of the wireless handset and displayed on the wireless handset.

DRAWINGS

The present subject matter will be more fully understood by reference to the following drawings, which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. Additionally, the systems and methods may vary as to details, order of the actions, or other variations without departing from the illustrative methods disclosed herein.

The conversion of a wireless communication device such as a mobile handset to a software valet that is at the beck and call of the user is described. Note, the terms wireless communication device and mobile handset are used interchangeably. Ideally, the solution is hardware agnostic, so the wireless communication device may be a mobile phone, a mobile Wi-Fi handset, or a WiMAX handset. The goal is to provide an integrated platform that supports the personalization of data flow for a wireless communication device. The illustrative application is targeted messaging as a function of the user profile, user location, and time. The user profile includes a plurality of user preferences such as dining preferences, entertainment preferences, drink preferences, and other such personalized preferences.

The solution supports target advertisements, personalization, and permits a handset to "close the transactional loop" where the mobile handset becomes a Point-of-Sale (POS) device.

The mobile handset which performs the operations described above may be used to support mobile gaming transactions within a casino environment, support secure lottery based transactions, or similar gaming related activities. Thus, the mobile handset can also be converted into a secure gaming device, and the description provided in the patent application entitled BIOMETRIC BROADBAND GAMING SYSTEM AND METHOD filed in 2001 by the same named inventor, which is hereby incorporated by reference to describe a networked server based gaming system.

The wireless communication device may be a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless communication device, mobile handset, wireless phone, and mobile phone are interchangeable.

The wireless communication device is in communication with an antenna. The antenna may be one of a plurality of base station antennas associated with a cellular phone network, or an antenna associated with wireless local area network access point, and may use Wi-Fi or WiMAX, or other such networking protocols.

The goal of a casino property is to keep players on the property, keep players busy gambling, and get players back on the property. The illustrative service offering is integrated into a wireless communication device that may be provided as a complimentary service to the player. The wireless communication device provides the well-known service offerings of a cell phone. Additionally, the wireless communication device is programmed to receive a variety of messages with user-specific information, such as preferred gaming experience, food preferences, and other specific offerings associated with the individual. Thus, if the prospective player is off the casino property, a targeted desirable message is sent, e.g. "Limo is waiting with front row tickets for Van Morrison. Respond if you want to see show." If the user responds with a "yes," a ticket or other means for authorizing entry to the show is sent to the handset.

Note that the player or player tracking solution can also be used to support wireless gaming such as a sports book, horse racing, bingo, slots, and even table games.

The cross-over applications for the illustrative solution are established by using the illustrative solution to communicate targeted advertising or messages and to facilitate transactions, such as gift card transactions, loyalty transactions, coupon based transactions and similar small transactions, i.e. transactions less than $10. The user profile is used to filter messages and to perform mobile commerce transactions. The location information can be used to detect and prevent fraud, and the transactional size minimizes the impact of fraud.

In the illustrative embodiment, a targeted message is sent to a user, and then a transaction may be facilitated with the message or advertisement. Preferably, the user profile remains secure and in control of the user. The user profile filters information on behalf of the user, so that only desirable content is received. The advertisements are managed and controlled so that they conform to local laws.

For utility and/or process engineering applications, one sample application is securely sending automated messages that are triggered by sensor outputs and location, e.g. wireless telemetry to an affordable wireless communication device. For example, in certain high risk working environments such as nuclear power plants, oil well platforms, or oil refineries, there is a need to provide individuals with real-time alarm data that is location specific. This illustrative solution supports sending these targeted messages as a function of location, time and sensor input to an affordable handset leveraging an existing wireless network infrastructure.

Another industrial application includes regulatory applications such as environmental monitoring. With the described solution all that is needed is a wireless communication device or PC card that is in communication with a sensor network. Data can be securely accessed from any networked device. User profiles can be created that filter content, so a first set of information is available to the regulatory agency, a second set of information is available to off-site personnel or consultants and a third set of information is available to on-site personnel handling day-to-day activities.

Finally, the illustrative solution can support a military application that prevents "friendly fire" casualties because messages can be sent on a real-time basis as function of the user location, regardless of the type of wireless network. The illustrative solution resides on an affordable wireless communication device that securely identifies location, and can be used to validate that a particular user is NOT an enemy combatant.

Figure 1:
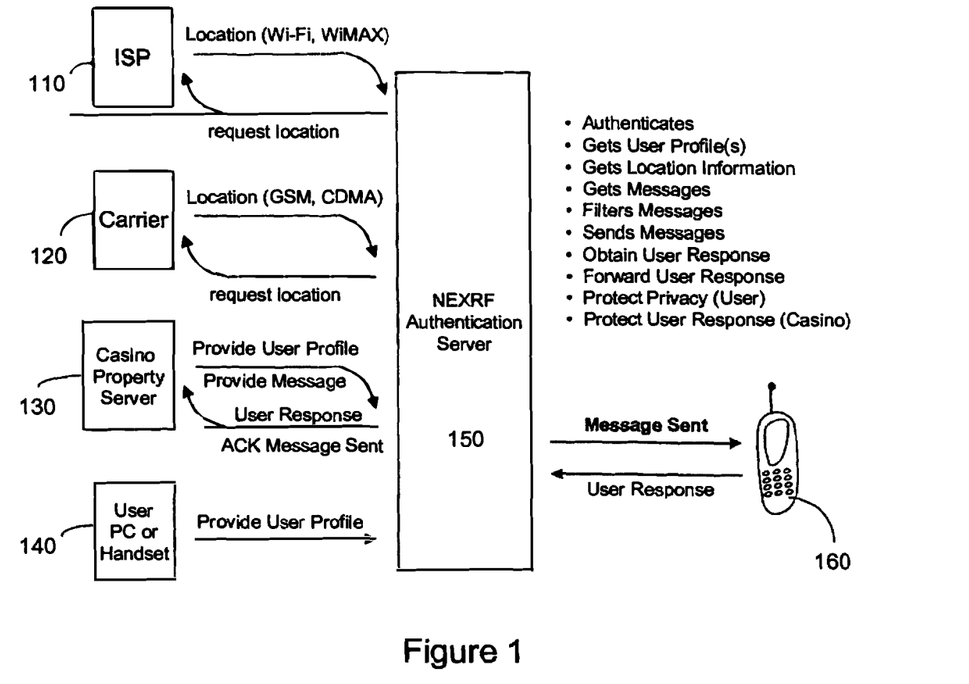
FIG. 1 shows an illustrative client-server system for player tracking using a wireless communication device.

In a first illustrative embodiment, the solution is embodied in a client-server architecture as described in FIG. 1. The client-server system model is scalable, and supports multiple clients and servers.

In FIG. 1, the location information is collected from an ISP 110 and/or a Carrier 120. The collection of location information is feasible if authorized by the user. If for instance the "user" is a casino property that is loaning the wireless communication device 160 to a casino guest, then the casino property may elect to have the location information for the wireless communication device 160 available to an authorized entity such as the intermediary server 150. In an alternative embodiment, where the owner of the handset 160 is the casino guest, the casino guest opts-in to provide location information to the intermediary server 150 based on the user profile submitted by the casino guest and downloads the software program that mirrors the operations performed by the casino property's wireless communication device.

The illustrative ISP 110 provides wireless connectivity using one of a plurality of networking standards such as Wi-Fi or WiMAX. The ISP 110 is configured to identify the location of the wireless communication device 160 using well known location based techniques such as triangulation, GPS, and other such methods. The illustrative Carrier 120 that provides wireless services must comply with the E911 regulations and also generates location information. This location information is served by the ISP 110 or Carrier 120 to the intermediary server 150.

A variety of different user profiles may be collected from different sources. For simplicity, a first user profile is collected from a casino property, and a second user profile is collected directly from the user. In the casino generated user profile, the casino may indicate user preferences such as cocktail preferences and dining preferences. The casino user profile may comprise monitored betting activity associated with the player and accumulated points stored in a player account according to a monetary value of the monitored betting activity. Complimentary goods or services are determined based on the accumulated points associated with the player account, and a message may be sent to the wireless communication device 160 associated with the complimentary goods or services that are consistent with the user profile. The casino user profile can also be used as a basis to provide mobile concierge services.

The second user profile may be generated separately by a player using a personal computer (PC) 140 and may indicate the user's "comp" preferences where the player may prefer to obtain tickets to a particular Vegas show and to opt-out of receiving comps for a particular dining establishment.

The intermediary server 150 authenticates information that is received from each source. The intermediary server 150 gathers the user profile information including user preferences and obtains the location information. Additionally, the intermediary server 150 receives the messages, which are to be sent to the user as a function of the user profile, location, and time. The illustrative messages are generated by the illustrative casino property; however, the content may be generated by any other entity identified by the user's particular profile. An intelligent agent or "virtual" agent is generated based on the one or more user profiles, and messages are filtered according to the user preferences that are embodied in an agent's requirements. Filtered messages are then sent to the wireless communication device 160.

The intermediary server 150 then waits for a user response. The user response may be positive and the user may wish to proceed with obtaining more information or acknowledging a particular action. The user may also NOT like the message sent, and the user response may be an opt-out request that states this message is undesirable. Alternatively, the user may provide a "thumbs up" or "thumbs down" feedback. Regardless, the resulting response is sent to the casino server 130. The user profile resident on the intermediary server 150 is updated based on the user response.

In an alternative embodiment, the functions of the casino property server 130 and the authentication server 150 are performed on a single server for either a brick-and-mortar casino property or for a web-based casino property. If the intermediary server 150 resides on the casino property, privacy laws may be impacted because of perceived overreaching by the casino property because it warehouses location information. However, anonymity may not be an issue in certain foreign jurisdictions.

Although there a numerous benefits in the client-server architecture, there are also limitations associated with the client-server architecture that are not overcome by distributed object computing. These limitations include cost, lack of scalability, a single point of failure, administration difficulties, and the inefficient use of network resources. The peer-to-peer architecture is intended to address the limitations of the client-server solution and a migration from the client-server solution to the P2P solution is anticipated. In a peer-to-peer architecture clients are also servers and routers. Additionally, each node contributes content, storage, memory, and processing resources. The network is dynamic and nodes are free to enter and exit the network. The nodes can also collaborate directly with one another. Furthermore, nodes can have varying capabilities.

The goals and benefits of peer-to-peer systems include efficient use of resources so unused bandwidth, storage, and processing power at the edge of the network can be used efficiently. P2P systems are also scalable because there is no central information, communication and computation bottleneck. The P2P systems are also reliable and provide no single point of failure. There is also an ease of administration because the nodes self-organize and have built-in fault tolerance, replication, and load balancing, resulting in increased autonomy. Since a P2P network is not a centralized system, there a greater degree of anonymity and privacy in a P2P network. Since the P2P environment is highly dynamic, ad-hoc communication and collaboration is supported.

Figure 2:
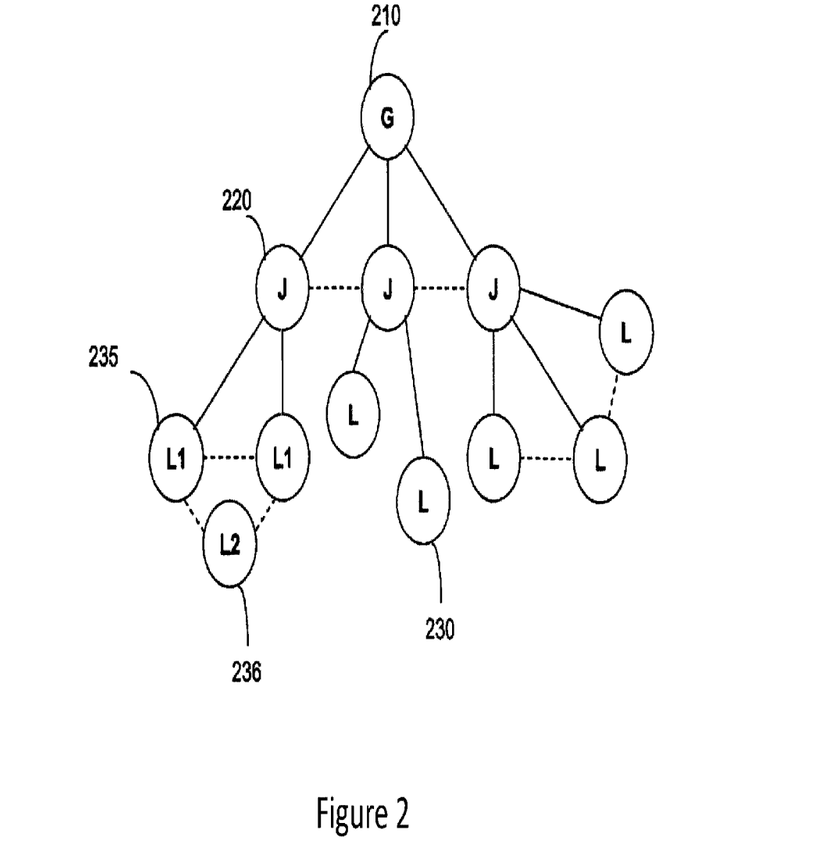
FIG. 2 shows an illustrative peer-to-peer system for player tracking using a wireless communication device.

Referring to FIG. 2 there is shown an illustrative hierarchical P2P network which provides a second illustrative embodiment. For the illustrative P2P embodiment, the illustrative embodiment is a hierarchical peer-to-peer network that is comprised of three different types of nodes: Global Node(s) 210, Jurisdictional Node(s) 220, and Local Node(s) 230. There may be different levels or subsets for each type of node, e.g. L1 235 and L2 236. The hierarchical peer-to-peer network overlay is highly scalable, robust, and secure. The P2P overlay resides on a group of personal computers or servers, and leverages resources within an existing network infrastructure.

The development of the user profile including the user preferences and monitored betting activity or "personalization" is performed and controlled by the user (or the casino property). Thus, the user profile remains resident on the wireless communication device or personal computer that is used to access the illustrative network. By having users control their own profiles, the user ensures that desirable messages are received.

The Global Node (G) 210 authenticates each node in the network including the Jurisdictional Node 220 and the L1 235 and L2 236 Local Nodes. Additionally, the Global Node 210 authenticates the user accessing the network. The Global Node 210 provides oversight for the operations performed by each Jurisdictional Node 220. The Global Node 210 also ensures that the files being shared by each node have the stated content. The Global Node 210 combines the user profile information received from the L1 nodes 235, the L2 nodes 236, and Jurisdictional Nodes 220 and generates a virtual agent. The virtual agent then filters information, and sends the filtered information to the L2 node 236, e.g. the user's wireless communication device 160.

In one embodiment where the user's privacy concerns are a high priority, the Global Node 210 performs the operations of an anonymizing proxy, so the user, the user profile and the wireless communication device 160 become anonymous. In another embodiment where the systems' security concerns are the highest priority, the Global Node 210 provides oversight for the operations performed by the L1 235 and L2 236 nodes and anonymizing services are not performed.

In the illustrative P2P embodiment, the user profile is generated from information provided by the store (L1 node 235), and the user (L2 node 236). Also, information may be provided from the Jurisdictional Node 220. Additionally, logged user profiles from a search engine may be used to contribute to the user profile. Although information from the Jurisdictional Node 220 and the logged search profiles from the user may contribute to the virtual agent, these contributions may conflict with the expectations of the store (L1 node 235) and the user (L2 node 236).

For example, a store may not want to enable a user to perform a search for a particular item being sold at a store, thus the store may want to block searches on Google while the user is within the store. The store may achieve this goal if the store can convince the Jurisdictional Node 220 that specific search engines are to be blocked while the user is within the store. Note, the store can itself become a Jurisdictional Node 220 if the store provides in-store Wi-Fi access. The user can elect to circumvent this blocking by using the anonymizing services provided by the Global Node 210. However, these anonymizing services may not permit the user to obtain the same rebates or coupons as the user could obtain if the user elected not to be anonymous.

Regardless of the situation, the user, the store, and possibly even the Carrier 120/ISP 110 determine the scope of their relationship, and P2P architecture simply facilitates building this relationship.

The illustrative Global Node 210 may also be configured to share transactional revenues with Jurisdictional Nodes 220 and Local Nodes 230 that contribute to the transaction. Completed Point-of-Sale (POS) transactional information may also be shared.

The Jurisdictional Node (J) 220 controls access to the network. The Jurisdictional Node 220 may be associated with an illustrative Carrier 120, service provider, or casino property. The Jurisdictional Node 220 pushes personalized data to the user based on the user's profile. The Jurisdictional Node 220 also polices the activities of each Local Node 230 within its network, and if a local node 230 is generating inappropriate content, the infected Local Node(s) 230 having the inappropriate content is blocked by the Jurisdictional Node 220. Additionally, the Jurisdictional Node 220 may have stored or generated user-specific information that it is willing to "share" with the Global Node 210 so that a "better" virtual agent can be generated on behalf of the user.

The Jurisdictional Node (J) 220 controls access to the network. The Jurisdictional Node 220 is associated with an illustrative Carrier 120 or service provider 110. The Jurisdiction Node 220 pushes personalized data to the user based on the user's profile. The Jurisdictional Node 220 also polices the activities of each Local Node 230 within its network, and if a local node 230 is generating inappropriate content, the infected Local Node(s) 230 having the inappropriate content is blocked by the Jurisdictional Node 220. Additionally, the Jurisdictional Node 220 may have stored or generated user-specific information that it is willing to "share" with the Global Node 210 so that a "better" virtual agent can be generated on behalf of the user.

Jurisdictional Node 220 tools may be licensed to the Carrier 120 and/or service provider 110. The tools permit the Jurisdictional Node 220 to generate revenue from sharing user profile information and from converting the wireless communication device to a Point-of-Sale (POS) device.

The Local Node (L) 230 stores the content that is sent via a targeted message. The local nodes 230 either provide or receive location information associated with the wireless communication device 160. There are two types of local nodes: the L1 Node 235 is a store-centric node; and the L2 Node 236 is user-centric.

The L2 Node 236 (user) is associated with the user and may reside on the users PC 140 and/or the users wireless communication device 160. The L2 Node 236 is configured to receive user profile information such as dining preferences, banking preferences, shopping preferences, in-store preferences, and opt-out preferences. For example, an opt-out preference may be "Block ALL Starbucks Messages." Additionally, the L2 Node 236 (user) may receive location information and permits users to communicate location information.

Additionally, the L2 Node 236 (user) may convert the wireless communication device 160 to a Point-of-Sale (POS) device that can use coupons, rebates, and gift cards. The L2 Node 236 (user) is configured to close the transactional loop after receiving a targeted message and completes a transaction associated with the targeted message.

The L1 Node 235 (store) may also have user profile information that it would like to contribute to generate the localized targeted advertisement. The Local Nodes 230 store content is associated with a particular location. For example, the L1 Node 235 (store) may store indoor and outdoor advertising messages, so one message is received in a parking lot and another message is received within the store.

The L1 Node 235 (store) software enables the store to generate mobile advertisements for handsets and to share the store's user profile. Additionally, the software enables the store to convert the wireless communication device to a POS device is also provided.

The L2 Node 236 (user) software is freely distributed, unless the L2 Node 236 (user) software is used for industrial and/or military applications. For industrial and/or military applications, the entire hierarchical P2P network overlay will likely operate within a single organizational structure.

Casino Application

The casino application may reside in either the client-server network architecture or the P2P network architecture. However, because of the degree of control need over sensitive player information and because of the progression towards server based gaming, the client-server network architecture is likely the preferred architecture.

Player tracking is an important element of a casino property's goal to retain players and build player goodwill. Player tracking information is information related to how a player wagers in a casino property. Based on the player tracking information, the casino determines how to "comp" the player. Comps are complimentary gifts or services that are provided to the player, e.g. gaming credits, redeemable cash, free rooms, room upgrades, tickets to shows, show upgrades, complimentary restaurant meals, etc. Player tracking information is extremely sensitive and proprietary information that a casino property does NOT share with any competitors. Currently, player tracking is used to track "regular players" and usually a regular player is provided with a mag stripe card that the player swipes into a gaming machine or gives the dealer at a table game their card.

In a first casino property embodiment, the player is provided with a mobile handset that is GPS and/or location enabled. For illustrative purposes only, the player is a "whale" or high roller. The handset may provide local anonymity and the same benefits of an in-room phone. In a second casino property embodiment, the player provides a phone number, and allows one or more software applets to be downloaded to their handset.

Casino properties maintain profiles for their preferred players. These profiles are used to create an experience that keeps the player coming back to the property. The system and method described herein place the casino staff at the beck and call of the player.

For the casino property application, the user profile is provided by the casino property and may be managed by the casino property. The user profile for a particular player may include information such as cocktail preferences, dining preferences, entertainment preferences, gaming preferences, and opt-out preferences. The handset can be used to gain VIP admissions to clubs and shows, and even room access.

In the casino property embodiment, the carriers will need to provide location information. In certain instances, such as within a building, GPS information may be more difficult to obtain, and a Wi-Fi network may be needed within the casino property, e.g. gaming zones and high roller suites.

To accommodate the user, a handset may be loaned to the user. The type of handsets that are loaned must possess a user interface (UI) that is attractive to the user. However, there may be resistance to using a new handset, when the user has invested so much time in understanding the existing UI on the user's current handset. Therefore, to accommodate the type of user not wishing to switch handsets, then the handset must be configured to receive one or more software programs, e.g. Java applets, which reside on the handset, and provide the functionality described above.

For illustrative purposes only, a dual mode handset is selected that includes CDMA, EV-DO and Wi-Fi technology. The handset is GPS enabled. Wi-Fi technology and related triangulation technologies are used in certain locations where GPS may not provide sufficient accuracy. For example, it may desirable to send a high roller a targeted message when the high roller is at the Bar telling them that they qualify for a $500 credit, or they have "won" a free meal or a suite upgrade. Additionally, the handset may have a large storage component that stores user specific information that is triggered based on location and/or user requests. Thus, a desirable and targeted video message can play after the user has been sitting at the Bar for five minutes, and this message may be pre-loaded on the handset.

The handset may also be programmed in English or the whale's language of origin, e.g. Japanese, Mandarin, Korean, Arabic, Farsi, etc. The interface may be modified to include concierge information, and point of interest (POI) information. Room service and similar casino services can also be programmed into the handheld device.

In the illustrative casino property embodiment, player tracking information is not shared with another casino property and is not used for data mining by the Carrier because this will destroy the trust relationship that is being developed with the player and the casino property. Thus, it is of the utmost importance that this information not be accessible by a competing casino property.

Consumer Application

The consumer application may reside in either the client-server network architecture or the P2P network architecture. However, because of the viral nature of P2P networks and because of the desire for various entities to maintain the confidentiality of their information, a distributed solution such as a P2P is likely the preferred architecture.

In the illustrative consumer oriented embodiment, personalization is performed by the user. Generally, the profile is generated using a browser on a personal computer. With the tools described, each user can create a tailored user profile. The user profile can include information such as preferred dining preferences, hobbies, banking preferences, shopping preferences, and opt-out preferences.

In the consumer oriented embodiment, the user can identify specifics associated with the user's service plan. For example, the user may have disabled web browsing because of the challenges associated with Web surfing on a handset. Thus, the user service plan may only support voice calls, and SMS messages. For this particular user, the user profile may be configured to send targeted SMS messages. Preferably, the advertiser pays for the cost of the SMS message.

For the consumer oriented embodiment, one goal is to minimize the need for network modifications. Our goal is to provide an offering to carrier or service provider in which the user can configure their handset in a manner consistent with the actions performed by a highly targeted Mobile Virtual Network Operator (MVNO), except the embodiment adds a location component, user profiles and virtual agents.

Thus, the illustrative tools are able to simulate providing a user-defined MVNO handset that is adaptable. So, if a user starts with voice and SMS, MMS and obtains targeted messages that are limited by screen resolution and functionality of the handset, the user may wish to upgrade handsets and upgrade service features to obtain the more desirable targeted advertising. For example, coupon promotion may accommodate the advertisers and carriers business model, so a better promotion may be received on a more sophisticated handset.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for tracking a customer in at least one casino property, the method comprising the steps of:
   monitoring, by a server, a customer's personal wireless handset location associated with the customer through one or more location-based technique;
   authenticating, by the server, the customer's personal wireless handset;
   communicating, by the customer's personal wireless handset using at least one wireless networking protocol, location information to the server;
   generating, by the server, a user profile associated with the customer, said user profile comprising a plurality of attributes including the location information and user preferences;
   determining, by the server, a complimentary prize based on the location information and at least one user preference; and
   sending, by the server, a message to the customer's personal wireless handset, wherein the message is associated with the complimentary prize.

2. The method of claim 1 wherein the plurality of attributes of the user profile further includes points stored in a customer account.

3. The method of claim 2 further comprising redeeming, by the server, the points in the customer account for the prize.

4. The method of claim 1 wherein the prize comprises one of gifts and services.

5. The method of claim 1 wherein the preferences include cocktail preferences, dining preferences, banking preferences, entertainment preferences, gaming preferences, shopping preferences, in-store preferences, and opt-out preferences.

6. The method of claim 1 wherein the message is associated with the location of the customers personal wireless handset.

7. The method of claim 1 wherein the one or more location-based technique includes GPS, triangulation, CDMA, EV-DO, and Wi-Fi.

8. The method of claim 1 wherein the customer's personal wireless handset includes a location service that generates location information, wherein the location service includes one or more of GPS, triangulation, CDMA, EV-DO, and Wi-Fi.

9. The method of claim 1 wherein the customer's personal wireless handset is GPS-enabled.

10. The method of claim 1 wherein the customer's personal wireless handset is Wi-Fi-enabled.

11. A system for tracking customer activity at a casino property, the system comprising:
   a personal wireless handset associated with a customer, said personal wireless handset configured to transmit location information a server, said personal wireless handset configured to communicate with the server over a network using at least one wireless networking protocol;

the server configured to authenticate the personal wireless handset;

the server further configured to monitor a location of the personal wireless handset through one or more location-based technique;

the server further configured to generate a user profile associated with the customer, wherein the user profile includes a plurality of attributes including the location information and user preferences;

the server further configured to determine a complimentary prize based on the location information and at least one user preference; and the server further configured to send a message to the personal wireless handset, wherein the message is associated with the complimentary prize.

12. The system of claim 11 wherein the server is in communication with a plurality of input devices located at various venues of at least one casino property, and wherein the venues include slot machines, gaming tables, restaurants, retail sales locations, hotel check-in locations, and other service locations associated with the casino property.

13. The system of claim 11 wherein the plurality of attributes of the user profile further includes points stored in a customer account.

14. The system of claim 11 wherein the server is further configured to redeem points in the customer account for the prize.

15. The system of claim 11 wherein the prize comprises one of gifts and services.

16. The system of claim 11 wherein preferences include cocktail preferences, dining preferences, banking preferences, entertainment preferences, gaming preferences, shopping preferences, in-store preferences, and opt-out preferences.

17. The system of claim 11 wherein the one or more location-based technique includes GPS, triangulation, CDMA, EV-DO, and Wi-Fi.

18. The system of claim 11 wherein the wireless handset includes a location service that generates location information, wherein the location service includes one or more of GPS, triangulation, CDMA, EV-DO, and Wi-Fi.

19. The system of claim 11 wherein the personal wireless handset is GPS-enabled.

20. The system of claim 11 wherein the personal wireless handset is Wi-Fi-enabled.

* * * * *